United States Patent [19]

Rohner

[11] 4,259,990
[45] Apr. 7, 1981

[54] SPACER IN CONCENTRIC TUBE SYSTEMS

[75] Inventor: Peter Rohner, Isernhagen, Fed. Rep. of Germany

[73] Assignee: Kabel-und Metallwerke, Gutehoffnungshütte A.G., Hanover, Fed. Rep. of Germany

[21] Appl. No.: 50,337

[22] Filed: Jun. 20, 1979

[51] Int. Cl.³ .................. F16L 9/18; H01B 7/22
[52] U.S. Cl. .................. 138/113; 138/114; 138/148; 174/28; 174/29
[58] Field of Search .................. 174/28, 29; 138/112, 138/114, 113, 148; 87/3, 8

[56] References Cited

U.S. PATENT DOCUMENTS

| 2,038,973 | 4/1936 | Wentz | 174/28 |
| 2,348,752 | 5/1944 | Quayle | 174/29 X |
| 2,488,211 | 11/1949 | Lemon | 174/28 |
| 2,585,484 | 2/1952 | Menes | 174/29 X |
| 2,890,263 | 6/1959 | Brandes | 174/102 D X |
| 3,748,373 | 7/1973 | Remy | 174/29 X |
| 3,750,058 | 7/1973 | Bankert | 174/29 |

FOREIGN PATENT DOCUMENTS 2432427 1/1976 Fed. Rep. of Germany ............ 174/28

Primary Examiner—Richard R. Kucia
Attorney, Agent, or Firm—Smyth, Pavitt, Siegemund, Jones & Martella

[57] ABSTRACT

A spacer for concentric tubes is constructed as a helical braid; the braid elements have smooth or contoured surfaces, are of a solid configuration, or are made from stranded filaments. The elements or filaments are made from synthetic (polymer) material or metal, or one uses both kinds of materials in the same braid or element.

12 Claims, 2 Drawing Figures

SPACER IN CONCENTRIC TUBE SYSTEMS

The present invention relates to a spacer for coaxial or concentric tubes and more particularly, the invention relates to a helical spacer interposed between an inner tube and an outer tube of a concentric tube system in which the tubes have different temperatures. Such a tube system is used, for example, as a cryogenic cable and/or conduit for transporting hot or cooled fluids.

Cryogenic cables are, for example, comprised of superconductors being disposed in or constructed as a tube, and liquid helium is caused to flow also through that tube. This particular tube is the innermost one of a concentric tube system in which respective two concentric tubes are spaced for the purpose of thermal insulation to obtain a controlled temperature gradiant from ambient to the liquid helium. The space between the innermost tube and the one surrounding it is usually evacuated and the space between the latter and the next one (third in radial outward direction) is, for example, filled with liquid nitrogen. The space between this third tube and the next one (in radially outward direction) is again evacuated. Typical examples for such kinds of tube systems are shown in U.S. Pat. Nos. 3,866,315 and 3,873,799.

It can readily be seen that such a system can be used as a cryogenic cable, but the innermost tube may also serve just as conduit for a very low temperature fluid. It is essential in all cases to minimize the influx of thermal energy. Particularly, economical operation of such a system requires that heat conduction and radiation influx into the interior of the tube system be impeded. The two evacuated annular spaces provided respectively between the first and second tubes, and between the third and fourth tubes serve as barriers against such influx of heat while the liquid in the space between the second and third tubes controls the temperature gradiant and removes any heat that flows in.

The evacuated space between respective two tubes is not completely empty, but is occupied to some extent by a spacer, or spacer construction or assembly which supports the respective inner tube in the outer one (or vice versa). Adequate support is mandatory in, of, and by such a spacer, or spacer system; but the physical contact with the respective tubes should be minimized to reduce the size and cross section of the inevitably resulting heat bridges. A particularly advantageous type of spacer for this purpose is disclosed, for example, in U.S. Pat. Nos. 3,592,238; 3,670,772; 4,121,623; and (Ser. No. 847,083, filed Oct. 31, 1977). These spacers constitute themselves tortuous paths for heat as the ribbons and other elements engage each other and the tube in individual, possibly statistically distributed, isolated points or lines. It must be observed, however, that any such construction is inevitably a compromise. No matter how desirable it is to reduce to near zero the effective cross section of heat conduction in radial direction, one must provide for adequate support of the two concentric tubes in relation to each other, bearing in mind that this is a load-bearing type of support; the inner one of two tubes may be filled with liquid (or with a subsystem of concentric tubes, the innermost one being filled with, or passed through, by liquid), and the outer tube carries either more outer tubes and/or outer insulation. It is, therefore, an object of the present invention to further improve the spacer construction for concentric tube systems which further reduces the effective size of the path for influx of conductive heat, without impairing the requisite support function as defined. Moreover, it is desirable to construct the tube system in a manner providing for and/or retaining a certain amount of flexibility as the system may have to be installed along curved paths. The spacer construction must not impede or impair such flexibility.

DESCRIPTION OF THE INVENTION

It is an object of the present invention to provide a new and improved spacer construction for concentric tube systems which minimizes heat conduction as between the two tubes to be spaced apart, but under conditions which retain the mutual support function of the tubes.

It is another object of the present invention to provide a new and improved spacer for concentric tubes which is and remains flexible.

It is another object of the present invention to improve cryogenic tube systems with regard to the thermal insulation of their interior.

It is, therefore, a specific object of the present invention to provide a new and improved spacer between two concentric tubes.

In accordance with the preferred embodiment of the present invention, it is suggested to provide a spacer for such a concentric tube system by braiding individual strands, and winding the braid around the inner one of the two concentric tubes. Thus, the spacer so produced could also be termed a helical braid. The braid elements engage each other in but a few, discrete points and lines only, and the points of contact with the tube are few and far apart. The braid is longitudinally resilient. Thus, upon cooling little if any axial force is exerted upon either tube. Moreover, the radial dimensions contract upon cooling, reducing further the contact with the tubes. The braid elements are preferably of circular cross section and may have a surface contour such as longitudinal or annular grooves or surface roughness to minimize further any contact and particularly to reduce, or even avoid, line contact. The braid elements may themselves be stranded filaments. Synthetic material (polymers) is preferred; but if the inner tube serves as a conduit for very hot fluid, metallic elements may be needed. For reasons of strength, use of a combination of synthetic metal braid elements may be advisable. If an element is made from stranded filaments, one may use also here synthetic filaments, metal wires, or a combination of both.

DESCRIPTION OF THE DRAWINGS

While the specification concludes with claims, particularly pointing out and distinctly claiming the subject matter which is regarded as the invention, it is believed that the invention, the objects and features of the invention, and further objects, features, and advantages thereof will be better understood from the following description taken in connection with the accompanying drawings in which

Proceeding now to the detailed description of the drawings, FIG. 1 shows a corrugated inner tube 1 made, e.g., of metal and serving, for example, as a conduit for a cryogenic liquid, possibly also serving as jacket for superconductors, or even being a superconductor. Alternatively, tube 1 may be provided as a conduit for very hot fluids.

Figure 1:
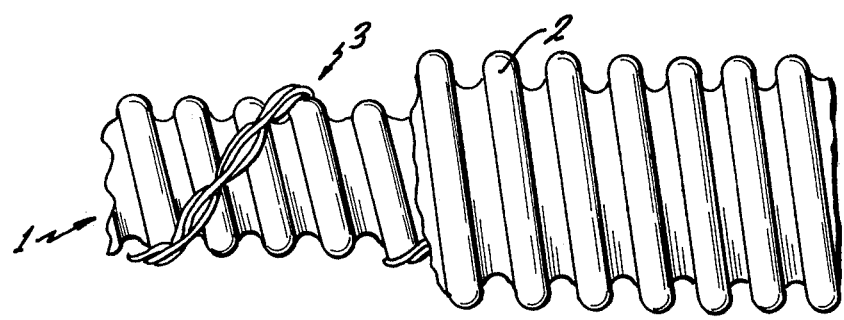
FIG. 1 is a schematic view of a cut-open concentric tube system improved upon by means of a spacer in accordance with the preferred embodiment of the present invention.
Figure 2:
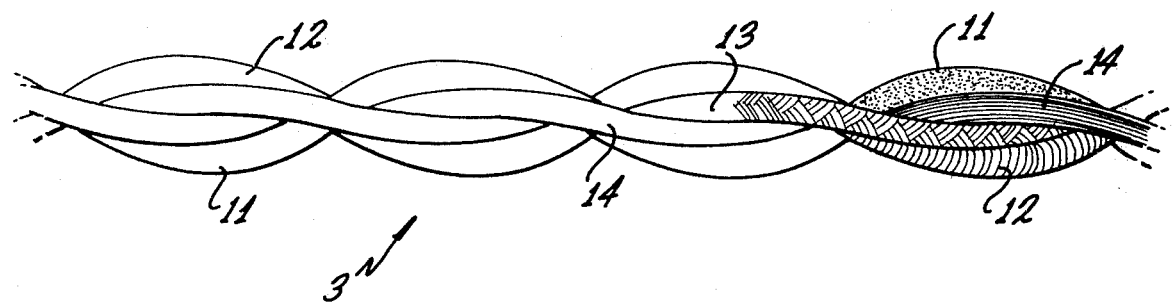
FIG. 2 is an enlarged view of the spacer shown by itself.

An outer tube 2 is concentrically disposed around the inner tube 1, and is also corrugated and, preferably, made of metal. The two tubes are spaced by the novel spacer 3, which is shown in greater detail in FIG. 2.

Spacer 3 is shown to be comprised of four braided together strands 11, 12, 13, and 14. The braiding pattern is chosen so that two strands, or elements, such as 11 and 12, are arranged on a first plane, each having a sinusoidal contour in that plane, but each being slightly deflected sinusoidally in a transverse plane. The two other strands, or braid elements, 13 and 14 are analogously arranged in these planes, except that the relationship is a reversed one.

As a consequence, the resulting braid is neither a tube nor has it a core.

Irrespective of the position of each element, or strand in the braid, this braid can be placed around the inner tube, providing only point-like contact therewith. This would even be true if the tubes had no corrugations. Point-like contact is ensured by providing the individual strands with a round, preferably circular, cross section, so that flat surfaces are avoided.

Due to braiding, the spacer is rather insensitive to tension. Thus, it may be coiled onto the inner tube 1 by means of a conventional coiler. Since the overall cross-sectional contour of the spacer is a circular one, it assumes consistently the proper and desired position, irrespective of any additional twisting that may result from the coiling. Correct position of the subsequently provided outer tube is automatically ensured for the same reason.

The braid, as coiled, is and remains longitudinally resilient. Thus, upon cooling or heating when the tube system is in use, very little axial tension is exerted upon tube 1. Moreover, in the case of cooling the outer effective diameter of the braid may reduce, thus reducing the point contacts further.

The spacer braid, as illustrated, is made from four elements. Of course, one could choose more. As stated, a round cross section for each element is preferred. However, particularly in the case of many braiding elements, the cross section of each is less important, and one may readily choose for such elements triangular, or quadratic, or other cross sections.

Turning to particulars of the individual elements, they may all have a smooth surface, or some of them may have a smooth surface. This is of advantage as far as braiding is concerned; the braiding machine will encounter little friction from the strands. This is particularly so if the strands, or elements, are made of a plastic or synthetic, such as polyethylene, polytetrafluorethylene, or the like. Alternatively, one may have to use metal elements if the inner tube serves as a conduit for very hot fluids, too hot for plastic material. One, or a few metal braid elements in the braid may be used in combination with plastic or synthetic ones for reasons of strength enhancement.

The heat conduction through the spacer can be impeded further by choosing an uneven surface for the strands and braiding elements. Examples here are illustrated in the right-hand portion of FIG. 2, whereby it should be noted that all of the different types of surface contours do not have to be used in one spacer braid. Rather, one may choose similar types of unevennesses throughout or just two types, or one may use only some of the elements with a profiled and uneven surface contour, and the others will have a smooth surface for reasons of ease of braiding. Thus, for the purpose of illustrative representation, strand, or element, 11 is shown to have simply a rough surface, resulting in randomly distributed microprotrusions and indentations. The contact with such an element is inherently limited to point contacts, line contacts are avoided.

Element 12 is shown to have annular grooves, and element 14 is shown to have longitudinal grooves. Either configuration provides also very limited contact with any other component it may engage. The surface unevenness of strand 13 is established, so to speak, indirectly. This element 13 is actually stranded or braided from individual filaments. Particularly in the case of stranding individual elements, one may use metal fibers, as they are stronger and the supporting function as well as any tension relief is improved. On the other hand, using stranded synthetic filaments is of advantage if weight reduction is a factor to be considered. In any event, a stranded braid element has by itself a reduced heat conductivity and an uneven surface.

Again, one will choose metal filaments, or elements, particularly in those cases in which the temperature of a fluid through tube 1 is very high; i.e., comparable to, or even above, the temperature, plastic can withstand without decomposing or even charring.

It may also be advisable in some cases to use a combination of metal and synthetic filaments to establish a stronger braid element. It can readily be seen that the choice here depends upon the conditions and the purpose and use of the concentric tube system.

The helical braid in accordance with the preferred embodiment is of light weight and contains less material than the several known spacers. Also, they are very economical because of savings in material as well as on account of ease of making, assembly, and placement.

The invention is not limited to the embodiments described above, but all changes and modifications thereof not constituting departures from the spirit and scope of the invention are intended to be included.

I claim:

1. A thermally insulating spacer construction for a concentric tube system, the system being comprised of, or including, an inner tube and an outer tube, the spacer construction being a helical device on the inner tube, the device comprising a plurality of braided strand elements, forming a single, nontubular, coreless braid which is helically wound on the inner tube, as a whole.

2. A spacer construction as in claim 1, at least one of the elements having a smooth surface contour.

3. A spacer construction as in claim 1, at least one of the elements having an uneven surface.

4. A spacer construction as in claim 3, the element having annular grooves and ridges.

5. A spacer construction as in claim 3, the element having longitudinal grooves and ridges.

6. A spacer construction as in claim 3, the element having a rough surface.

7. A spacer construction as in claim 3, the element being itself of stranded configuration.

8. A spacer construction as in claims 1, 2, 3, or 7, the element or elements, or at least one element, being made of a synthetic.

9. A spacer construction as in claims 1, 2, 3, or 7, the element or elements, or at least one element, being made of metal.

10. A spacer construction as in claim 1, at least one of the elements being made of a synthetic and at least one other of the elements being made of metal.

11. A spacer construction as in claim 1, there being four elements, two of which being arranged on a first plane, the other two being arranged on a second plane, extending transversely to the first plane.

12. A spacer construction as in claim 7, the element being made from stranded metal and synthetic filaments.

* * * * *